(12) United States Patent
Lucas et al.

(10) Patent No.: US 9,217,390 B2
(45) Date of Patent: Dec. 22, 2015

(54) THRUST REVERSER MAINTENANCE ACTUATION SYSTEM

(75) Inventors: James L. Lucas, Hamden, CT (US); Michael Charron, Baltic, CT (US)

(73) Assignee: United Technologies Corporation, Hartford, CT (US)

( * ) Notice: Subject to any disclaimer, the term of this patent is extended or adjusted under 35 U.S.C. 154(b) by 618 days.

(21) Appl. No.: 13/536,075

(22) Filed: Jun. 28, 2012

(65) Prior Publication Data

US 2014/0000237 A1    Jan. 2, 2014

(51) Int. Cl.
| | |
|---|---|
| *F02K 1/72* | (2006.01) |
| *B64D 29/08* | (2006.01) |
| *F02K 1/76* | (2006.01) |
| *F02C 7/28* | (2006.01) |
| *B64D 29/06* | (2006.01) |

(52) U.S. Cl.
CPC . *F02K 1/72* (2013.01); *B64D 29/06* (2013.01); *B64D 29/08* (2013.01); *F02C 7/28* (2013.01); *F02K 1/763* (2013.01); *F05D 2230/72* (2013.01); *Y10T 29/49238* (2015.01)

(58) Field of Classification Search
CPC .................. F01D 25/28–25/285; F01D 25/24; B64D 29/06; B64D 29/08; F01K 1/78–1/805
USPC ............... 60/226.2, 226.3; 244/110 B
See application file for complete search history.

(56) References Cited

U.S. PATENT DOCUMENTS

| | | | |
|---|---|---|---|
| 3,511,055 A * | 5/1970 | Timms ........................... 60/229 |
| 3,779,010 A * | 12/1973 | Chamay et al. ............. 60/226.2 |
| 4,037,089 A | 7/1977 | Horninger | |
| 4,044,973 A * | 8/1977 | Moorehead ..................... 244/54 |
| 4,232,516 A | 11/1980 | Lewis et al. | |
| 4,399,966 A * | 8/1983 | Crudden et al. ........... 244/129.4 |
| 4,679,750 A * | 7/1987 | Burhans ..................... 244/129.4 |
| 4,731,991 A | 3/1988 | Newton | |
| 5,350,136 A | 9/1994 | Prosser et al. | |
| 5,833,140 A | 11/1998 | Loffredo et al. | |
| 5,899,059 A | 5/1999 | Gonidec et al. | |
| 5,944,285 A | 8/1999 | Royer et al. | |
| 5,967,460 A | 10/1999 | Baudu et al. | |
| 6,000,216 A | 12/1999 | Vauchel | |
| 6,227,485 B1 * | 5/2001 | Porte ............................... 244/54 |
| 7,229,247 B2 | 6/2007 | Durocher et al. | |
| 7,735,778 B2 | 6/2010 | Lair et al. | |
| 7,789,347 B2 | 9/2010 | Oberle et al. | |
| 8,109,467 B2 | 2/2012 | Murphy | |

(Continued)

OTHER PUBLICATIONS

U.S. Appl. No. 13/431356, filed Mar. 27, 2012, "Gas Turbine Engine Thrust Reverser System".

(Continued)

*Primary Examiner* — Gerald L Sung
*Assistant Examiner* — Rene Ford
(74) *Attorney, Agent, or Firm* — Carlson, Gaskey & Olds, P.C.

(57) ABSTRACT

A thrust reverser system for a gas turbine engine includes a duct including a cowling movable between an open position and a closed position in a direction transverse to a centerline of the gas turbine engine. The thrust reverser is supported within the cowling and movable between an axial closed position, an axial intermediate position and an axial open position. A controller is actuateable to command movement of the thrust reverser from the axial closed position to the axial intermediate position such that the cowling is free to move to the open position.

11 Claims, 8 Drawing Sheets

(56) References Cited

U.S. PATENT DOCUMENTS

| | | |
|---|---|---|
| 8,127,531 B2 | 3/2012 | Parham |
| 2006/0145001 A1* | 7/2006 | Smith ........................ 244/110 B |
| 2010/0037587 A1 | 2/2010 | Vauchel et al. |
| 2010/0107599 A1* | 5/2010 | Vauchel ........................ 60/226.2 |
| 2010/0126139 A1* | 5/2010 | Howe ........................... 60/226.2 |
| 2010/0201190 A1 | 8/2010 | Pereira |
| 2010/0327110 A1* | 12/2010 | Caruel et al. .................... 244/54 |
| 2011/0167790 A1 | 7/2011 | Cloft et al. |
| 2011/0284660 A1* | 11/2011 | Vauchel et al. .......... 239/265.33 |
| 2014/0234090 A1 | 8/2014 | Hurlin et al. |

OTHER PUBLICATIONS

International Search Report and Written Opinion for PCT Application No. PCT/US2013/046931 mailed on Oct. 10, 2013.
International Preliminary Report on Patentability for International Application No. PCT/US2013/046931 mailed on Jan. 8, 2015.
European Search Report for EP Application No. 13809639.1 dated Jul. 22, 2015.

\* cited by examiner

THRUST REVERSER MAINTENANCE ACTUATION SYSTEM

BACKGROUND

A gas turbine engine typically includes a fan section, and a core engine section including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A nacelle structure surrounds the fan section and the core engine section and defines a bypass flow passage disposed annularly about the core engine section. A thrust reverser is provided within the nacelle structure to direct thrust to aid in slowing an aircraft. A portion of the nacelle structure is moved to provide access to the fan and core engine sections during maintenance operations. Nacelle structures including thrust reverser components can be cumbersome and difficult to manipulate, especially in larger engines. Accordingly, it is desirable to provide systems and components that provide the desired operational functions while also easing accessibility for maintenance.

SUMMARY

A thrust reverser system for a gas turbine engine according to an exemplary embodiment of this disclosure, among other possible things includes—a duct including a cowling movable between an open position and a closed position in a direction transverse to a centerline of the gas turbine engine, —a thrust reverser supported within the cowling and movable between an axial closed position, an axial intermediate position and an axial open position, and a controller commanding movement of the thrust reverser, wherein the controller is actuateable to move the thrust reverser from the axial closed position to the axial intermediate position such that the cowling is free to move to the open position.

In a further embodiment of the foregoing thrust reverser system, including a seal disposed on the thrust reverser engaging a seal surface of the duct when the thrust reverser is in the axial closed position and the seal is disengaged from the seal surface when the thrust reverser is in the axial intermediate position.

In a further embodiment of any of the foregoing thrust reverser systems, the seal surface is disposed radially outward of the seal.

In a further embodiment of any of the foregoing thrust reverser systems, a portion of the thrust reverser engages a radially outboard portion of the duct when the thrust reverser is in the axially closed position.

In a further embodiment of any of the foregoing thrust reverser systems, including an input powering an actuator of the thrust reverser for moving the thrust reverser to the axial intermediate position.

In a further embodiment of any of the foregoing thrust reverser systems, the input comprises a hydraulic fitting engageable to a ground support system.

In a further embodiment of any of the foregoing thrust reverser systems, including a user interface for actuating the controller to move the thrust reverser to the axial intermediate position.

In a further embodiment of any of the foregoing thrust reverser systems, the user interface includes a control valve accessible outside of the gas turbine engine.

In a further embodiment of any of the foregoing thrust reverser systems, the cowling includes an inner cowling covering a core engine portion of the gas turbine engine and an outer cowling spaced radially apart from the inner cowling.

A method of accessing components of a gas turbine engine according to an exemplary embodiment of this disclosure, among other possible things includes moving a thrust reverser from an axial closed position to an axially intermediate position, wherein a portion of the thrust reverser engages a fixed duct portion in the axially closed position and is free of the fixed duct in the axially intermediate position, and opening a cowling door supporting the thrust reverser to an open position.

In a further embodiment of the foregoing method, the thrust reverser is movable from the axially closed position to an axially open position and the axially intermediate position positions the thrust reverser in a position aft of the fixed duct portion and not to the axially open position.

In a further embodiment of any of the foregoing methods, including connecting a ground support system to an interface of thrust reverser system for supplying external power to an actuator for moving the thrust reverser system.

In a further embodiment of any of the foregoing methods, the interface comprises a hydraulic connection for providing hydraulic fluid to operate the actuator.

In a further embodiment of any of the foregoing methods, including a control valve for controlling actuation of the actuator and actuating the control valve to control movement of the thrust reverser to the axially intermediate position.

In a further embodiment of any of the foregoing methods, the thrust reverser includes a seal and the fixed duct portion includes a sealing surface mating with the seal and moving the thrust reverser to the axially intermediate position frees the seal from the sealing surface.

In a further embodiment of any of the foregoing methods, the cowling door includes an inner cowling covering a core portion of the gas turbine engine and an outer cowling spaced radially outward of the inner cowling.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
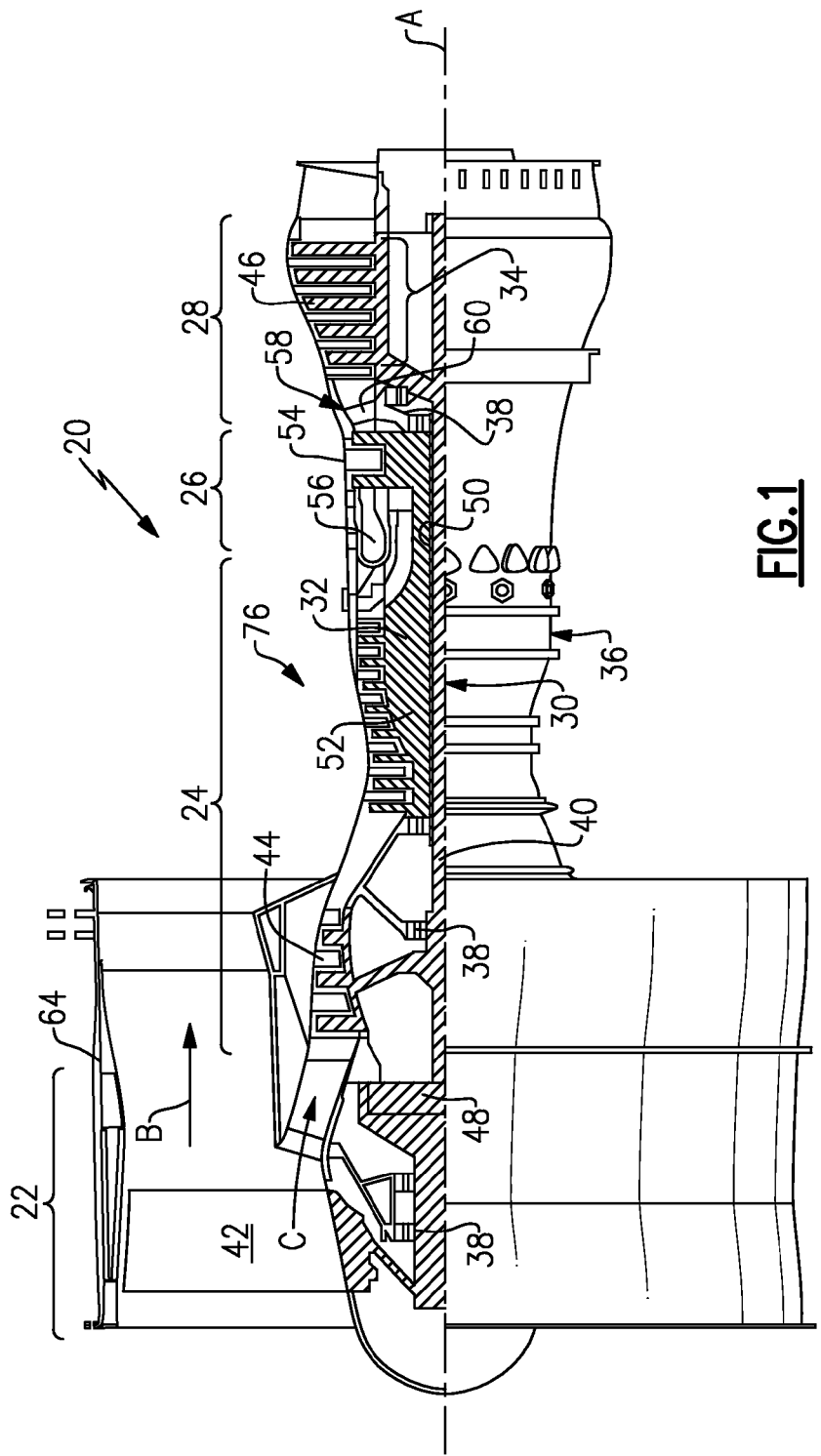
FIG. 1 is a schematic view of an example gas turbine engine.

FIG. 1 schematically illustrates an example gas turbine engine 20 that includes a fan section 22, and a core engine section 76 that includes a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The example gas turbine engine includes the fan section 22 disposed within a fan case 64. The example fan section 22 comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
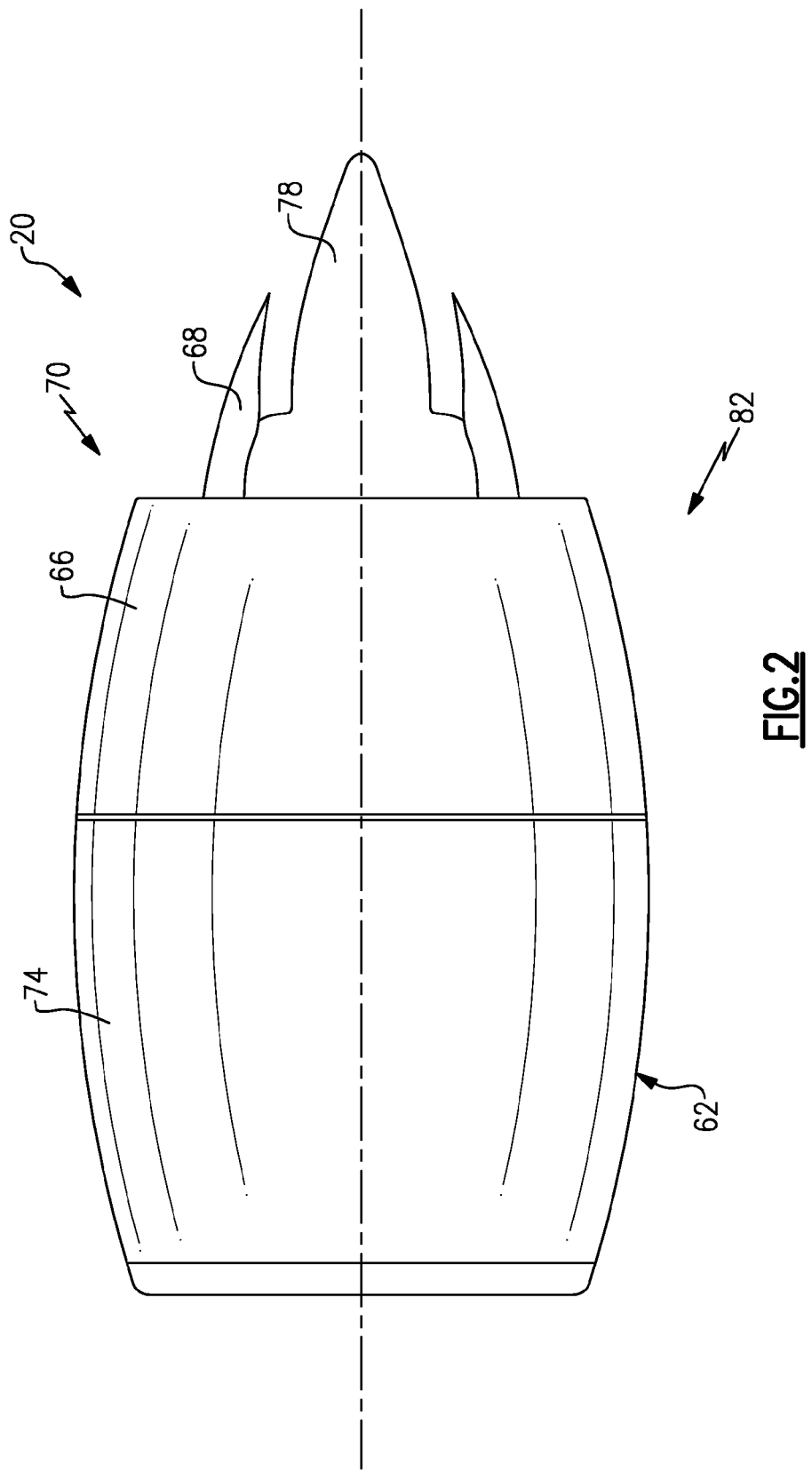
FIG. 2 is a side view of an example turbine engine including a nacelle assembly.

Referring to FIG. 2 with continued reference to FIG. 1, the example gas turbine engine 20 is enclosed within a nacelle structure 62. In this example, the nacelle structure 62 includes a fan cowling 74 and an aft cowling assembly 70. The nacelle structure 62 is disposed about the fan case 64 to define a portion of the bypass passage. A core nacelle inner cowl 68 is disposed around the core engine section 76. A tail cone 78 extends out from the core engine portion 76. The nacelle structure 62 includes the fan cowl 74 and the aft cowl 70 that are movable to an open position to allow access to the core engine 76 and the fan section 22.

Figure 3:
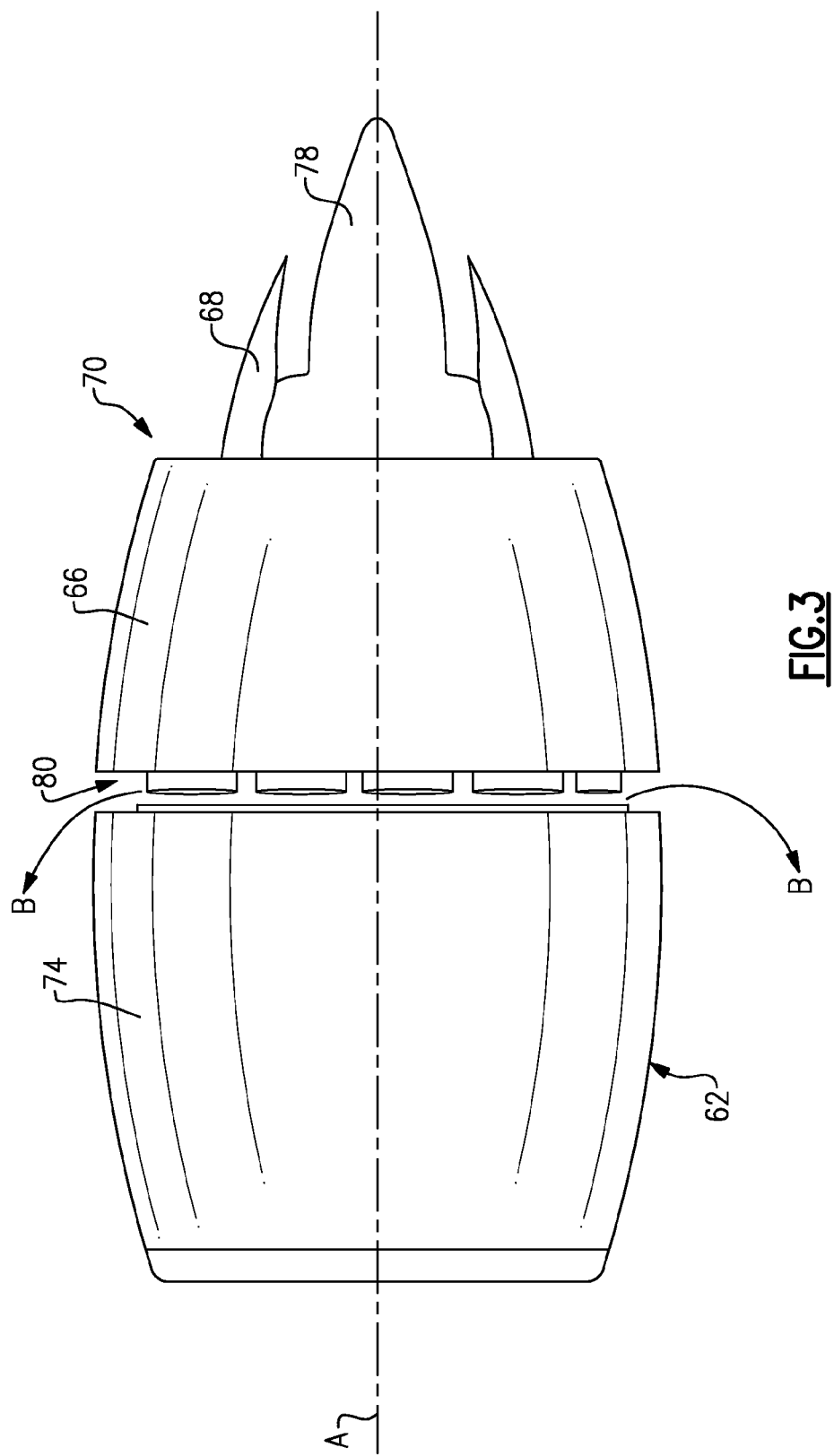
FIG. 3 is a side view of an example gas turbine engine with a thrust reverser in an open position.

Referring to FIG. 3, the example nacelle structure 62 includes a thrust reverser 80. The example thrust reverser 80 redirects bypass flow B through an opening created by moving of the aft cowl 70 rearwardly along the axis A. Movement of the aft cowl 70 along the axis A creates spacing between the fan cowl 74 and the aft cowl 70 through which bypass flow B is directed when in an open position. The aft cowl 70 includes an outer cowl 66 that is disposed about the bypass passage and the inner cowl 68 that surrounds the core engine assembly 76.

Figure 4:
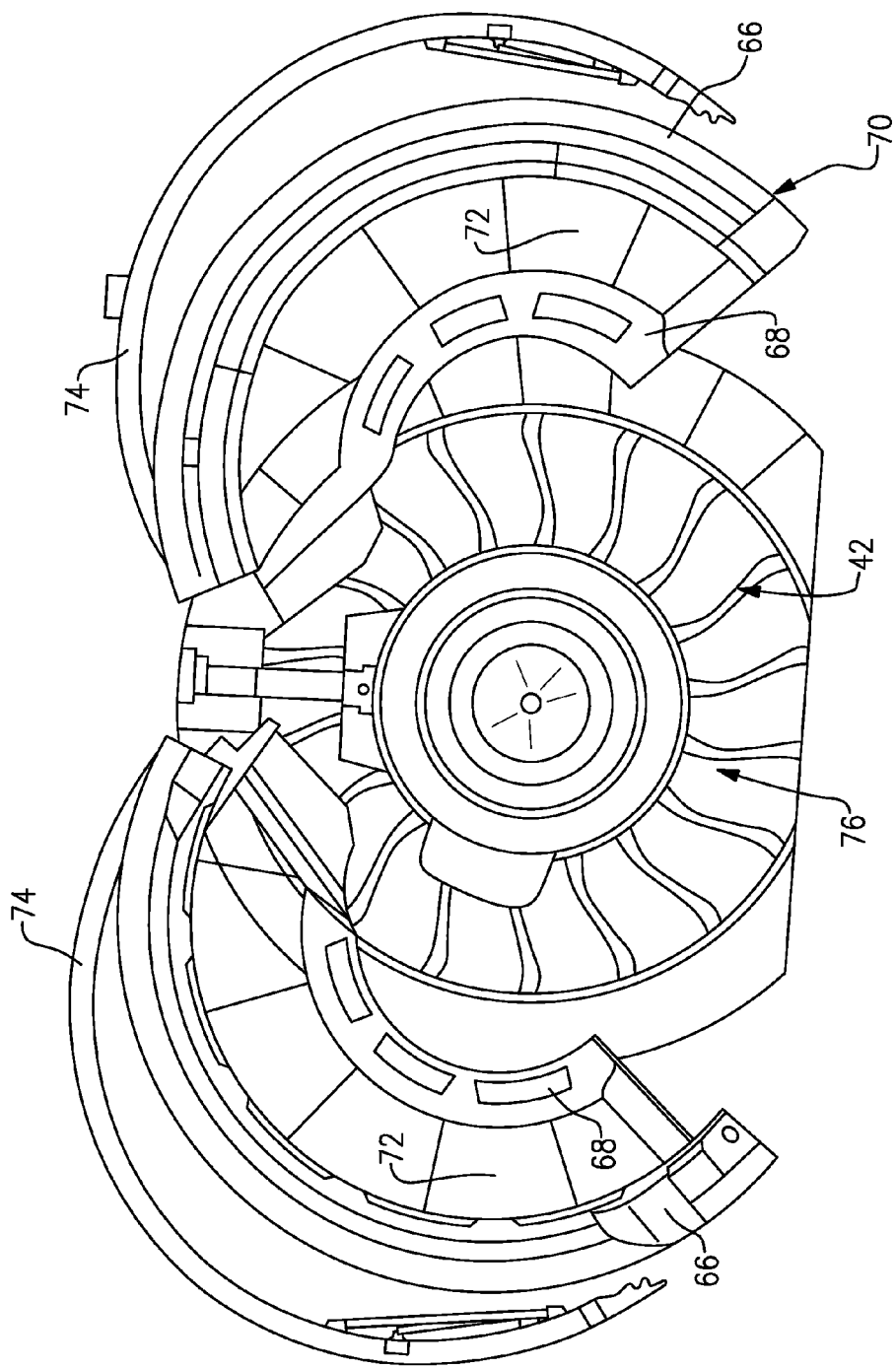
FIG. 4 is an aft view of the example gas turbine with the cowling doors of the nacelle assembly in an open position.
Figure 5:
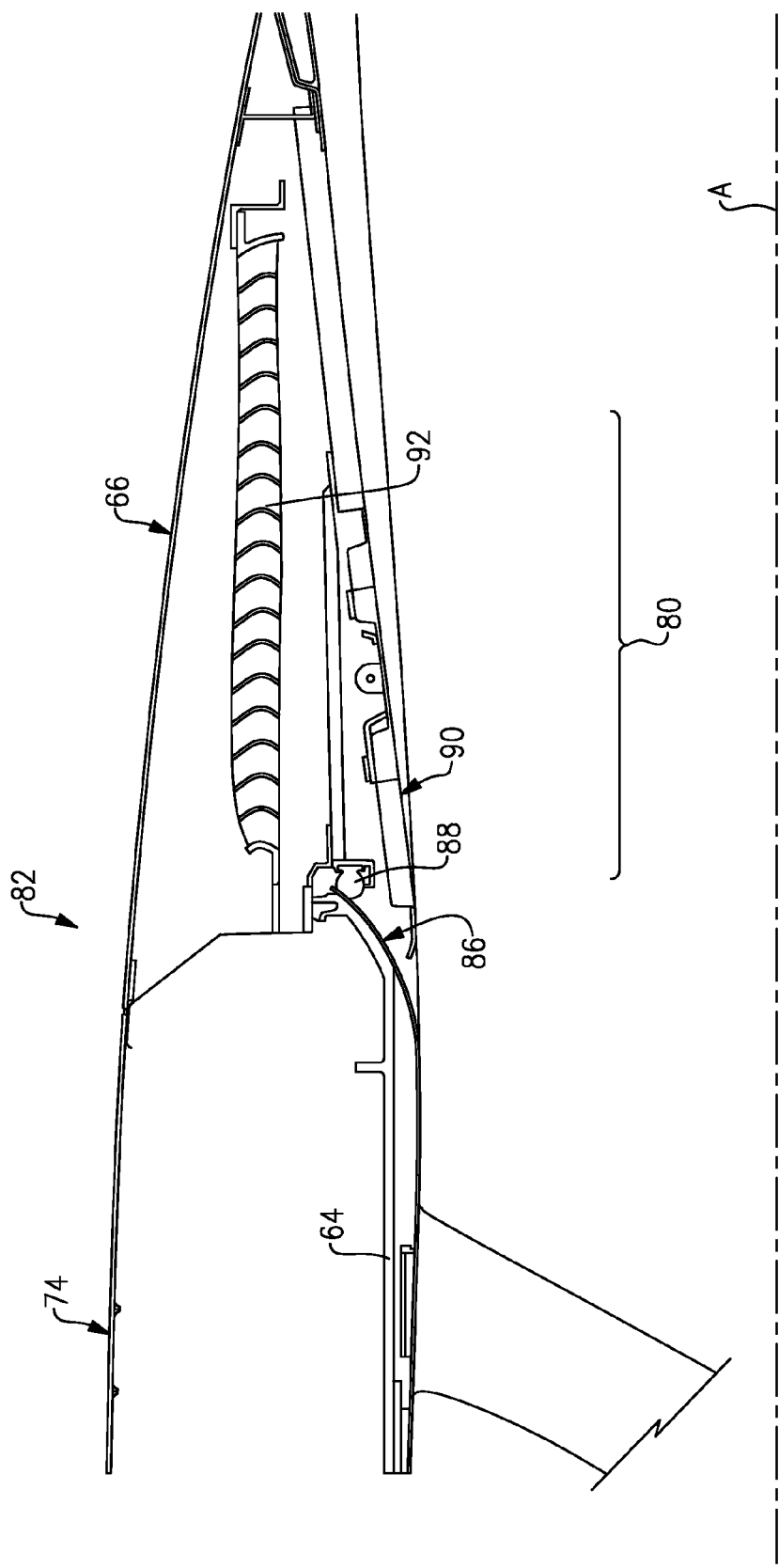
FIG. 5 is a cross-section of a portion of the thrust reverser in a closed position.

Referring to FIGS. 4 and 5, the example nacelle structure includes the fan cowl 74 that is openable to allow access to the fan section 22 and the aft cowl 70. The aft cowl 70 include the outer cowl 66 and the inner cowl 68 and a C-shaped duct 72 defined within a radial space therebetween. The aft cowl 70 is openable to allow access to the core engine section 76. Opening of the cowl 70 is accomplished by rotating the cowl 70 outward and upward about as shown in FIG. 4.

The aft cowl 70 includes the thrust reverser system 80. The example thrust reverser system 80 includes a blocker door 90 and a cascade assembly 92. In operation, the thrust reverser portion of the aft cowl 70 moves rearwardly along the axis A to create an opening in the radially external surface defined by the outer cowling 66 of the nacelle structure 62. A blocker door 90 pivots into the bypass flow B to block and redirect air radially outward to reduce and direct thrust produced by the gas turbine engine 20.

In this example, the fan case 64 includes a bullnose 86 that creates a surface for a seal 88 of the thrust reverser system 80. As appreciated, the seal 88 is engaged to the bullnose 86 and cannot move radially outward to allow opening of the aft cowling 70 because it is blocked by the bullnose 86. The example bullnose 86 is formed as an integral part of the fan case 64.

Figure 6:
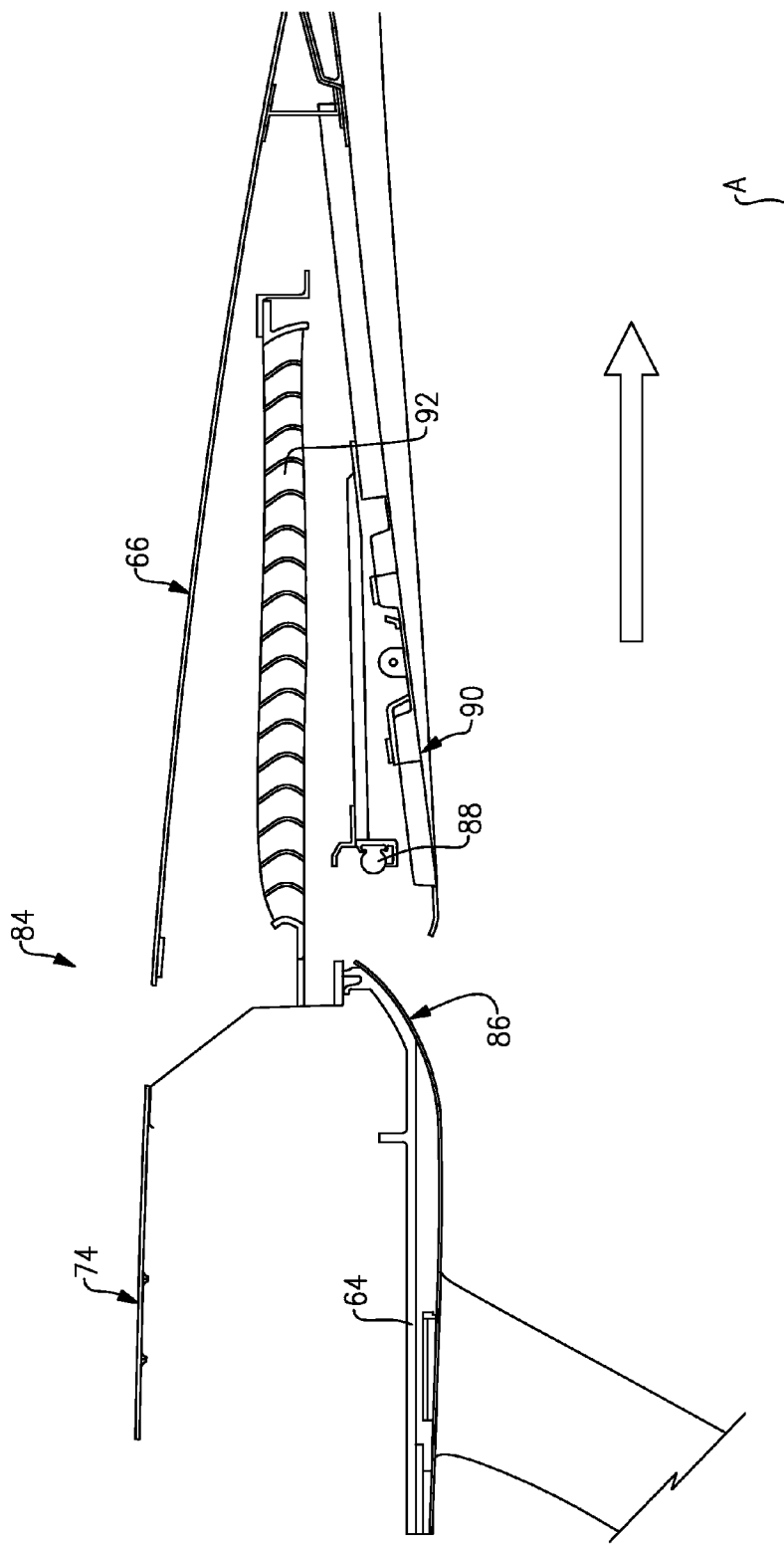
FIG. 6 is a cross-section of the thrust reverser in an intermediate open position.
Figure 7:
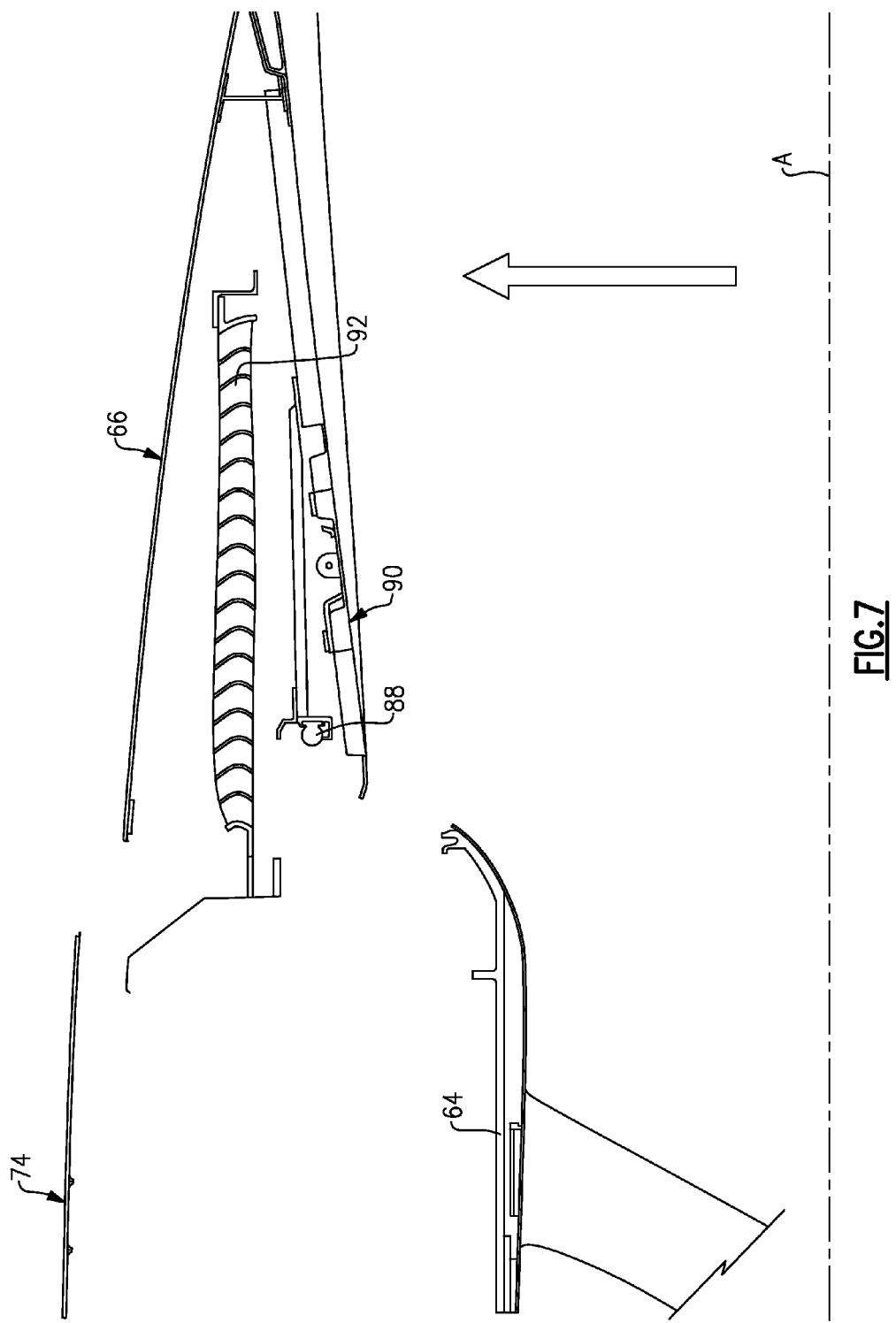
FIG. 7 is a cross-section of the example thrust reverser and aft cowling in an open position.
Figure 8:
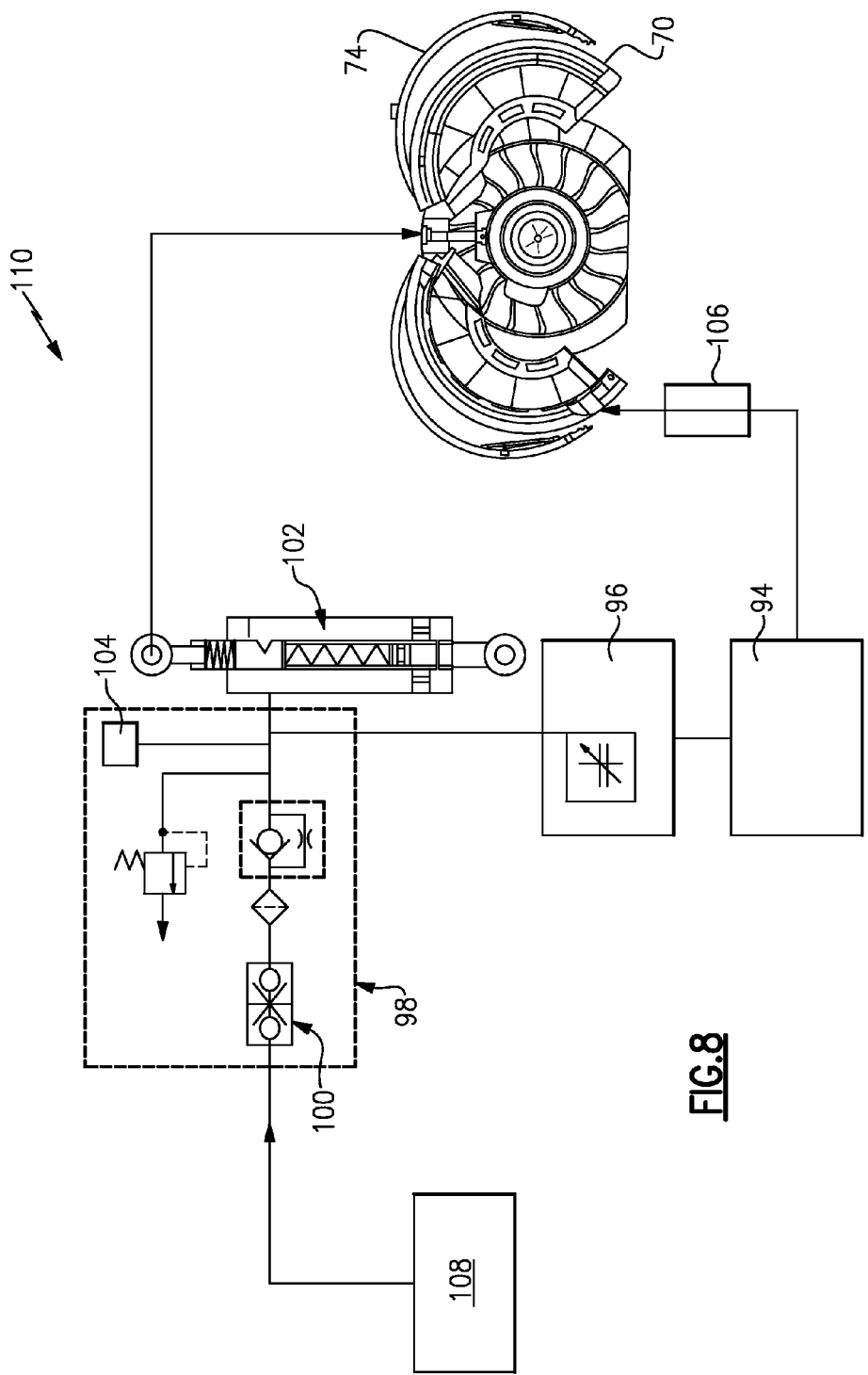
FIG. 8 is a schematic view of the example power door opening system.

Referring to FIGS. 6-8 with continued reference to FIGS. 4 and 5, the example system provides for the partial actuation of the thrust reverser system 80 to move the aft cowling 66 rearwardly along the axis A to disengage the seal 88 from the bullnose 86 such that the cowling 66 can be opened as is shown in FIG. 4.

In normal operation the thrust reverser 80 is locked in the closed position (FIG. 5) to prevent undesired actuation. However, to facilitate maintenance operations, the cowling doors 70 and 74 are opened to allow access to the core engine section 76. As appreciated, the example cowling doors 70, 74 are large and heavy and therefore an actuator 102 (FIG. 8) is utilized to move the cowling doors 70, 74 to the open position shown in FIG. 4. The actuator 102 is controlled by a power door opening system 98 that communicates and controls part of the thrust reverser system 80 for opening the thrust reverser to an intermediate position 84 (FIG. 6) to provide for opening of the aft cowling 70. Movement of the thrust reverser system 80 to the intermediate position 84 provides a clearance between the seal 88 and the bullnose 86, thereby allowing movement of the aft cowling 70 to the open position.

FIG. 6 illustrates movement of the aft cowl 66 to the intermediate open position 84 from the closed position 82 (FIG. 5) to disengage the seal 88 from the bullnose 86. The intermediate open position 84 is a position such that the blocker doors 90 and the cascade 92 do not move to an engaged position that blocks the bypass passage B. The intermediate open position 84 provides only sufficient axial movement for the seal 88 and other components of the aft cowling 72 to radially clear the bullnose 86.

Once the aft cowling 70 has been moved to the intermediate open position 84 illustrated in FIG. 6, the aft cowling door 70 may be moved to the radially open position (FIG. 7) and allow access to the core engine component 76.

Referring to FIG. 8 with continued reference to FIGS. 4-7, the example thrust reverser and power door operating system 110 utilizes the controller 96 that controls both the power door operating system 98 and a thrust reverser actuation system 94. As appreciated in typical operation, the thrust reverser 94 is locked in a closed position as illustrated in FIG. 5. In this position, the cowl door 70 cannot be opened. During maintenance activities when an aircraft is on the ground and the cowling door 70 is desired to be opened, the example actuation system 110 is utilized to control both the power door operating actuator 102 and the thrust reverser actuator 106 schematically illustrated at 106. The controller 96 will actuate the thrust reverser actuation system 94 such that the actuator 106 will move the outer cowling 66 to the intermediate open position 84 to clear the bullnose 86. Once the seal 88 and other portions of the thrust reverser system 80 are clear of the bullnose 86 then the power door actuating system 98 will engage in controlling the actuator 102 to move the aft cowling door 70 to the open position.

The example power door operating system 98 includes an input 100 to receive hydraulic fluid from a ground system 108. The ground system 108 provides hydraulic power to the power door operating system 98. As appreciated, during maintenance the gas turbine engine 20 is not operating, and therefore the hydraulic pumps and other mechanisms that normally would drive hydraulic actuators within the gas turbine engine 20 are not functioning. Accordingly, the ground operating system 108 is connected to the input 100 of the power door operating system 98. The controller 96 receives a signal indicating that hydraulic pressure is present within the operating system 98 and commands the thrust reverser actuation system 94 and the actuator 106 to power movement of the thrust reverser 80 to the intermediate open position 84.

Once in the intermediate open position 84, the actuator 102 will engage and open the cowl 70 to the open position. As appreciated, the controller 96 can control operation of both the power door actuator 102 and the thrust reverser actuator 106. However, a manual valve 104 actuateable by an operator on the ground may also be utilized. In such an example, once hydraulic pressure is provided within the power door operating opening system 98 the manual actuating valve 104 can be used to control and operate both the thrust reverser actuator 106 and the power door operating actuator 102 to facilitate movement of the aft cowling 70 such that it may clear the bullnose 86 mounted to the fan case 64.

Accordingly, the example four door and thrust reverser maintenance actuation system utilizes the thrust reverser actuator 106 to move the thrust reverser to an intermediate open position 84 that clears the bullnose 86 to allow for access to the gas turbine engine and by opening of the C-duct aft cowling 70.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A thrust reverser system for a gas turbine engine comprising:
 a duct including a cowling movable between an open position and a closed position by a door actuator in a direction transverse to a centerline of the gas turbine engine;
 a thrust reverser supported within the cowling and movable between an axial closed position, an axial intermediate position and an axial open position, wherein a portion of the thrust reverser engages a radially outboard portion of the duct when the thrust reverser is in the axially closed position;
 an input powering a thrust reverser actuator for moving the thrust reverser to the axial intermediate position;
 a controller commanding movement of the thrust reverser actuator and the door actuator, wherein the thrust reverser actuator is actuateable to move the thrust reverser from the axial closed position to the axial intermediate position such that the cowling is free to move responsive to the door actuator to the open position; and
 a user interface accessible outside of an aircraft including the gas turbine engine, the user interface for operating the controller to move the thrust reverser from the axial closed position to the axial intermediate position, wherein the cowling is movable to the open position when the thrust reverser is in the axial intermediate position and the user interface is further configured to operate the controller to activate the door actuator to move the cowling to the open position when the thrust reverser is in the axial intermediate position.

2. The thrust reverser system as recited in claim 1, including a seal disposed on the thrust reverser engaging a seal surface of the duct when the thrust reverser is in the axial closed position and the seal is disengaged from the seal surface when the thrust reverser is in the axial intermediate position.

3. The thrust reverser system as recited in claim 2, wherein the seal surface is disposed radially outward of the seal.

4. The thrust reverser system as recited in claim 1, wherein the input comprises a hydraulic fitting engageable to a ground support system.

5. The thrust reverser system as recited in claim 1, wherein the user interface includes a control valve accessible outside of the gas turbine engine.

6. The thrust reverser system as recited in claim 1, wherein the cowling includes an inner cowling covering a core engine portion of the gas turbine engine and an outer cowling spaced radially apart from the inner cowling.

7. A method of accessing components of a gas turbine engine comprising:
 moving a thrust reverser from an axial closed position to an axially intermediate position, wherein a portion of the thrust reverser engages a fixed duct portion in the axially closed position and is free of the fixed duct in the axially intermediate position;
 connecting a ground support system to an interface of the thrust reverser system for supplying external power to an actuator for moving the thrust reverser system to the axially intermediate position, wherein the interface comprises a hydraulic connection for providing hydraulic fluid to operate the actuator; and
 opening a cowling door supporting the thrust reverser to an open position.

8. The method as recited in claim 7, wherein the thrust reverser is movable from the axially closed position to an axially open position and the axially intermediate position positions the thrust reverser in a position aft of the fixed duct portion and not to the axially open position.

9. The method as recited in claim 7, including a control valve for controlling actuation of the actuator and actuating the control valve to control movement of the thrust reverser to the axially intermediate position.

10. The method as recited in claim 7, wherein the thrust reverser includes a seal and the fixed duct portion includes a sealing surface mating with the seal and moving the thrust reverser to the axially intermediate position frees the seal from the sealing surface.

11. The method as recited in claim 7, wherein the cowling door includes an inner cowling covering a core portion of the gas turbine engine and an outer cowling spaced radially outward of the inner cowling.

* * * * *